United States Patent [19]

Heisey et al.

[11] Patent Number: 4,934,565
[45] Date of Patent: Jun. 19, 1990

[54] LIQUID DISPENSING SYSTEM WITH ELECTRONICALLY CONTROLLED VALVE REMOTE FROM NOZZLE

[75] Inventors: George H. Heisey, Greensboro, N.C.; George T. Devine, Kettering, Ohio

[73] Assignee: Gilbarco Inc., Greensboro, N.C.

[21] Appl. No.: 246,498

[22] Filed: Sep. 19, 1988

[51] Int. Cl.⁵ .............................................. B67D 5/30
[52] U.S. Cl. ...................................... 222/22; 222/470; 222/504; 141/128; 251/129.04; 251/129.08
[58] Field of Search ................. 222/14, 20, 22, 28, 222/71, 504, 470, 473, 529, 16; 141/96, 128, 198; 251/129.03, 129.04, 129.05, 129.08, 129.18, 129.19

[56] References Cited

U.S. PATENT DOCUMENTS

| | | |
|---|---|---|
| 2,192,714 | 3/1940 | Norman et al. ............... 251/129.04 |
| 2,799,466 | 7/1957 | Hickerson . |
| 2,860,266 | 11/1958 | Schrader . |
| 3,259,154 | 7/1966 | Scherer . |
| 3,343,720 | 9/1967 | Barry ................................ 222/20 |
| 3,380,491 | 4/1968 | Rosell . |
| 3,424,951 | 6/1969 | Barker . |
| 3,537,475 | 11/1970 | Pettinger . |
| 3,590,890 | 7/1971 | Young . |
| 3,662,924 | 5/1972 | Crandall . |
| 3,916,961 | 11/1975 | Dilget ................................ 141/198 |
| 3,926,405 | 12/1975 | Arnold . |
| 3,974,879 | 8/1976 | Nelson et al. ................ 251/129.04 |
| 4,014,509 | 3/1977 | Yoshino . |
| 4,059,135 | 11/1977 | Hansel . |
| 4,284,212 | 8/1981 | Caswell . |
| 4,314,585 | 2/1982 | Nishimiya . |
| 4,360,127 | 11/1982 | Maruyama . |
| 4,428,558 | 1/1984 | Odogaki . |
| 4,429,708 | 2/1984 | Strueh . |
| 4,499,920 | 2/1985 | Steffan . |
| 4,503,994 | 3/1985 | Pyle . |
| 4,522,237 | 6/1985 | Endo . |
| 4,556,093 | 12/1985 | Jones . |
| 4,726,492 | 2/1988 | Komykai ............................ 222/14 |
| 4,793,589 | 12/1988 | Eldredge et al. ............ 251/129.08 |

Primary Examiner—H. Grant Skaggs
Attorney, Agent, or Firm—Kenneth Watov

[57] ABSTRACT

A liquid dispensing system for dispensing fuel such as gasoline, for example, includes a nozzle to which is mounted an actuator controlled transducer. The extent of movement of the actuator from a rest position causes the transducer to produce a flow rate signal having a magnitude proportional to the degree of movement of the actuator. The flow rate signals are electrically connected to a remotely located controller which responds to the signals by providing driving signals for operating a proportional flow control valve opening for attaining the called for flow rate of fluid to be dispensed from the remotely located valve, through a hose, to the nozzle for dispensement therefrom.

17 Claims, 15 Drawing Sheets

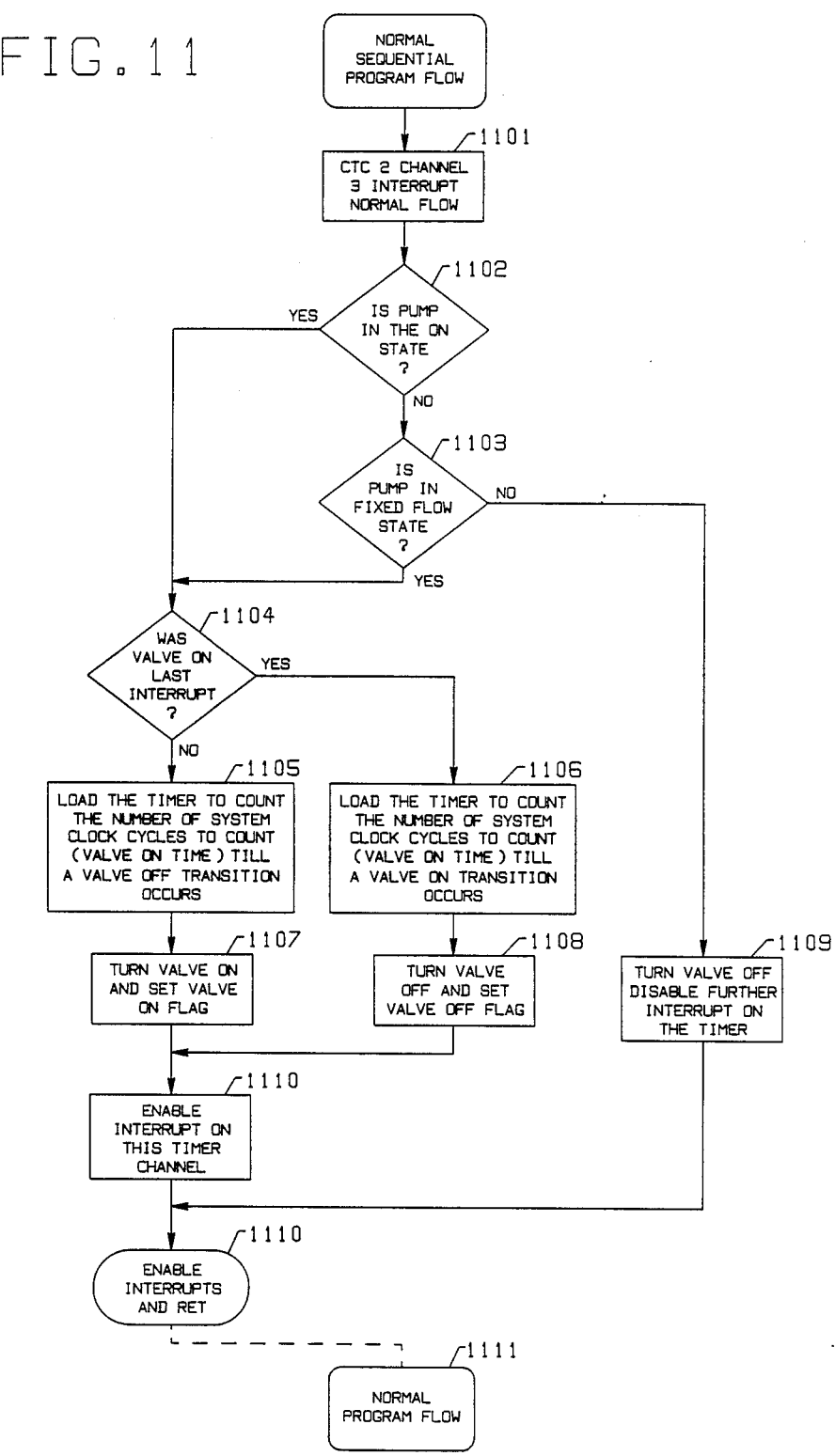

LIQUID DISPENSING SYSTEM WITH ELECTRONICALLY CONTROLLED VALVE REMOTE FROM NOZZLE

RELATED INVENTION

This invention is related to the copending application of George T. Devine, for "LIQUID DISPENSING SYSTEM WITH ELECTRONICALLY CONTROLLED VALVE REMOTE FROM NOZZLE", filed Sept. 19, 1988, having a common assignee, and the Ser. No. 07/246673.

FIELD OF THE INVENTION

The present invention relates generally to liquid dispensing systems, and more specifically to electronic controls for dispensing systems including electromechanical valves.

BACKGROUND OF THE INVENTION

Conventional liquid dispensing systems, such as used for dispensing gasoline, utilize a nozzle at the delivery end of a product hose. The nozzle is typically equipped with a direct acting, mechanically actuated nozzle valve. Such a valve makes the nozzle large and bulky, and the actuation force of the nozzle high. Also, with the control valve in the nozzle, the product hose is necessarily exposed to full system fluid pressures requiring the hose to have a substantially stiff and thick wall in order to prevent rupture of the hose and excessive dilation. To attain higher flow rates, the hose size and/or the fluid pressure must be increased, requiring thicker walled hoses having decreased flexibility, as a result. Lastly, electronically based conventional systems typically lack feedback signalling to the microprocessor or controller indicative of the nozzle actuator position, for providing diagnostic and control functions.

SUMMARY OF THE INVENTION

One object of the invention is to provide an improved liquid dispensing system.

Another object of the invention is to provide an improved liquid dispensing system including a relatively small and lightweight nozzle, with reduced pressure in the off state.

Yet another object of the invention is to provide an improved liquid dispensing system including a substantially small and flexible product hose.

Another object of the invention is to provide a liquid dispensing system capable of operating at relatively high pressures, with relatively small hoses and nozzles, for distributing liquid at relatively high flow rates.

Another object of the invention is to provide an improved liquid dispensing system with automatic closure of the fuel flow control valve upon severance of the product hose.

Still another object of the invention is to provide reduced hose dilation for improving the system accuracy in a liquid dispensing system.

With these and other objects of the invention and the problems of the prior art in mind, the present invention satisfies such objects and overcomes such problems in the prior art by providing a fuel dispensing system including an electromechanical transducer mounted on the nozzle, and coupled to an actuator or lever on the nozzle for providing an electrical output signal proportional to the positioning of the nozzle actuator handle from a rest or datum position (0 flow rate position). The output signal from the transducer is electrically connected to a controller means located in the dispenser housing for converting the signal to a valve drive signal, for controlling the opening of a proportional flow control valve located in the dispenser housing remote from the nozzle, and thereby controlling the rate of flow of the liquid being dispensed.

BRIEF DESCRIPTION OF THE DRAWINGS

Various embodiments of the present invention are described with reference to the drawings in which like items are identified by the same reference designation. The drawings are as follows.

Figure 1:
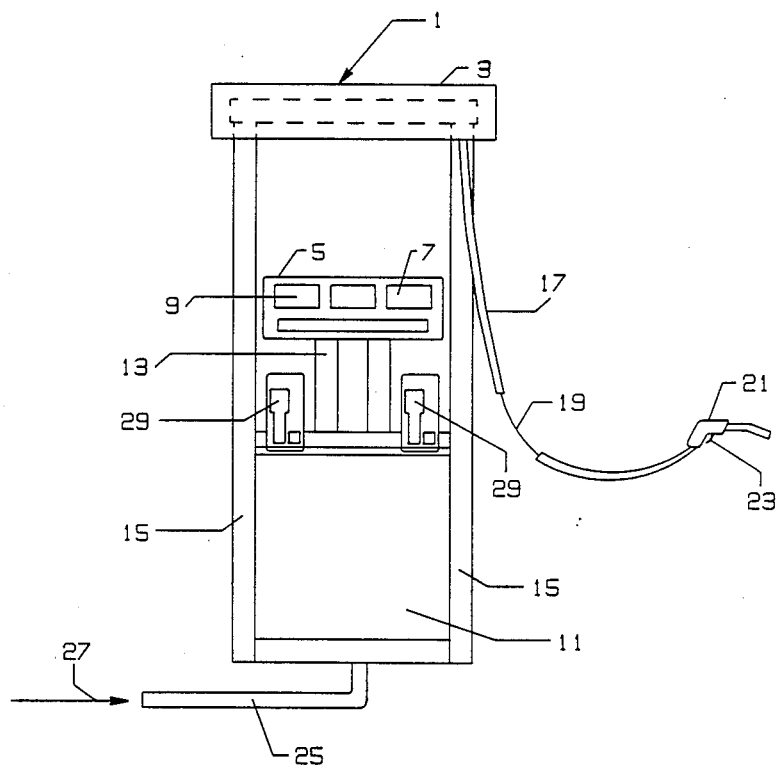
FIG. 1 is a partially cutaway pictorial of a liquid dispensing system incorporating various illustrative embodiments of the invention.

DESCRIPTION OF THE PREFERRED EMBODIMENT OF THE INVENTION:

With reference to FIG. 1, a dispenser system 1 including various embodiments of the invention is shown for purposes of illustration to include a high silouhette housing 3, a sub-housing 5 enclosing the control electronics for the system, in which an accessible key pad 7 and a display panel 9 are mounted, a lower storage housing 11 in which various electromechanical and mechanical devices (to be described in detail below) are enclosed, hollow vertical mounting posts 13 for mounting the control electronic and display housing 5 directly over the lower housing or enclosure 11, with electrical cabling including power and control lines (not shown) being routed through the vertical post 13 between the control housing 5 and the lower housing 11, two main vertical support posts 15 through which product and vapor recovery piping (not shown) are routed to the overhead canopy housing 3, a conduit for conveying liquid such as a relatively small and flexible product hose 17 coupled to product delivery piping (not shown) by appropriate coupling mechanisms located in housing 3, an electrical cable 19 shown in the cutaway section of product hose 17 carries electrical control signals between a relatively lightweight nozzle 21 and the control electronics or controller located within housing 5, an actuator lever 23 located on nozzle 21 (to be described in greater detail below), and a supply fluid conduit 25 for delivering liquid such as gasoline, for example, via a pump located in the underground storage tank (not shown), as indicated by the arrow 27, and two storage boots 29 for storing dispensing nozzles 21 when not in use (only one nozzle 21 and product hose 17 is shown). The storage boots 29 include pump handle switches (not shown) for turning off the dispensing system whenever a nozzle 21 is stowed in a boot 29 (to be described in greater detail below). As indicated, the liquid or fuel dispensing system shown generally in FIG. 1 is for purposes of illustration only, and many other arrangements may be utilized including various embodiments of the present invention.

Figure 2:
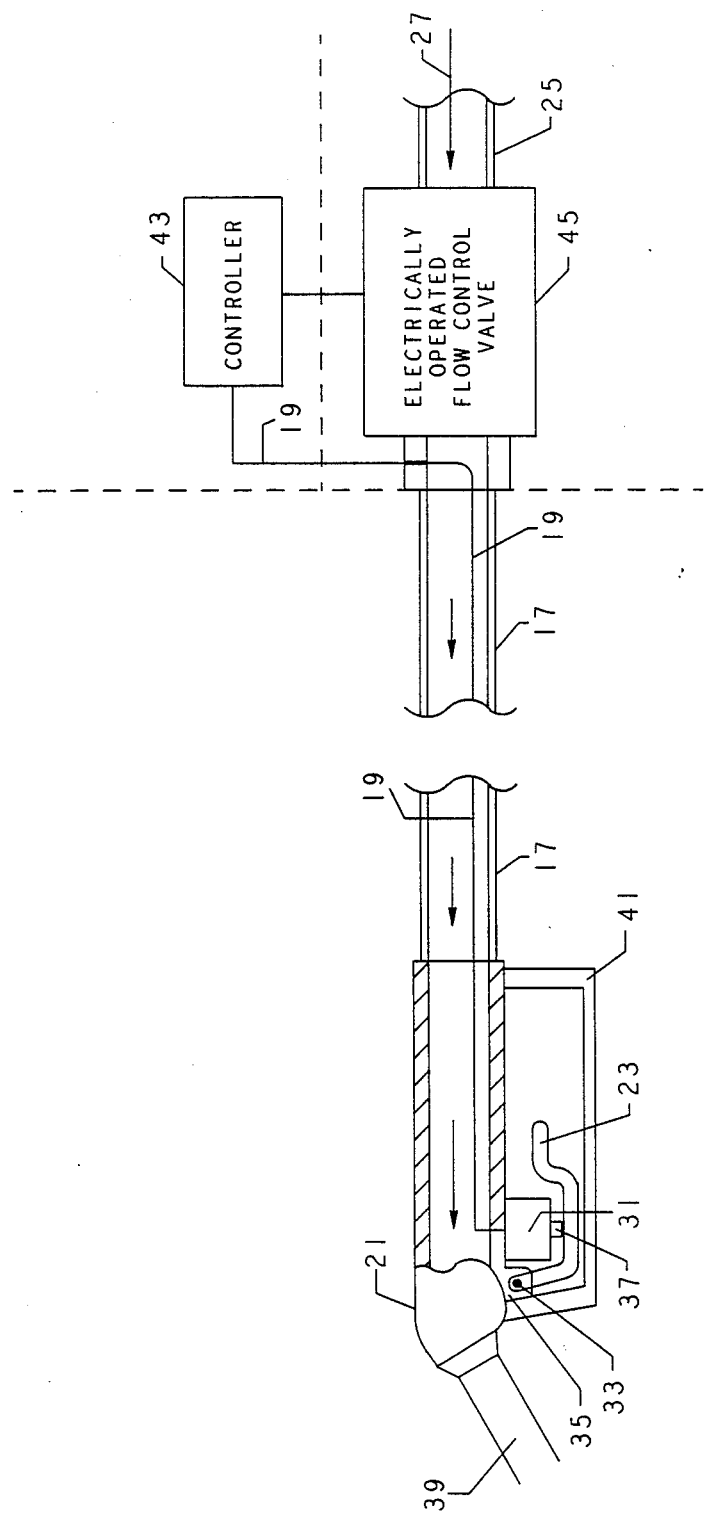
FIG. 2 is a pictorial/block diagram showing various illustrative embodiments of the invention.

A generalized block diagram of the invention is shown in FIG. 2, for example. In the embodiment shown, a transducer 31 is rigidly mounted on the nozzle 21, as shown, or incorporated within the nozzle 21. The actuator handle or dispenser control lever 23 is pinned via pin 33 to a mounting stud 35 of nozzle 21. A plunger 37 of transducer 31 rests against the inside surface of actuator 23 as shown. Note that the nozzle 21 also includes a dispensing spout 39, and a hand guard rail 41. The electrical cable 19 is routed between the transducer 31 and an electronic controller 43. The controller 43 is electrically connected to an electrically operated flow control valve 45.

In the simplified embodiment of the invention shown in FIG. 2, dispensing of liquid, typically a fuel such as gasoline, for example, is initiated by an operator lifting up actuator lever 23 against the relatively low resistance of transducer plunger 37, in turn causing the plunger 37 to correspondingly move back into transducer 31. Movement of the plunger 37 from its rest, null, or datum position causes transducer 31 to output an electrical signal having a magnitude, in this example, proportional to the distance of the plunger 37 or actuator 23 from the rest or datum position. Also, the magnitude of the output signal from transducer 31 corresponds to a desired flow rate for dispensing liquid from the outlet spout 39 of nozzle 21.

The controller 43 senses the magnitude of the output signal from the transducer 31 at any given time, and outputs a drive or control signal for controlling the degree of opening of the flow control valve 45 for obtaining the desired flow rate for dispensing the liquid received under pressure via the fuel or liquid supply fluid conduit 25. As previously described, in this example, the controller 43 is located within the control electronic housing 5, and the flow control valve 45 is located within the lower housing remote from the nozzle 21. Accordingly, in this embodiment of the invention, the nozzle 21 can be made relatively light and small compared to prior nozzle assemblies including mechanical valving mechanisms within the nozzle itself for controlling the flow rate of liquid dispensed through the nozzle. Also, with the flow control valve 45 located remote from nozzle 21, the product hose 17 is free from the relatively high fluid pressures that must be withstood by product hoses in prior systems. As a result, the product hose 17 can be fabricated from a relatively thin walled hose having a relatively small inside and outside diameter, compared to the product hoses of prior systems. As a result, the nozzle assembly 21 and product hose 17 are substantially smaller, of lighter weight, and much easier to manipulate than those of prior systems.

In addition, since the product hose 17 does not have to withstand high fluid pressures, substantially higher pumping pressures than possible in prior systems can be utilized in the present invention for providing substantially increased flow rates of fuel than practical in prior systems. Since the flow is controlled by the electrically operated flow control valve 45 rather than manually as in prior systems, the actuation force is only that required to operate the transducer 31. Therefore, the actuation force is substantially reduced and is not increased by increased fluid pressures. Also, the largest pressure drop occurs at valve 45 when the system is off rather in the nozzle 21.

Figure 3:
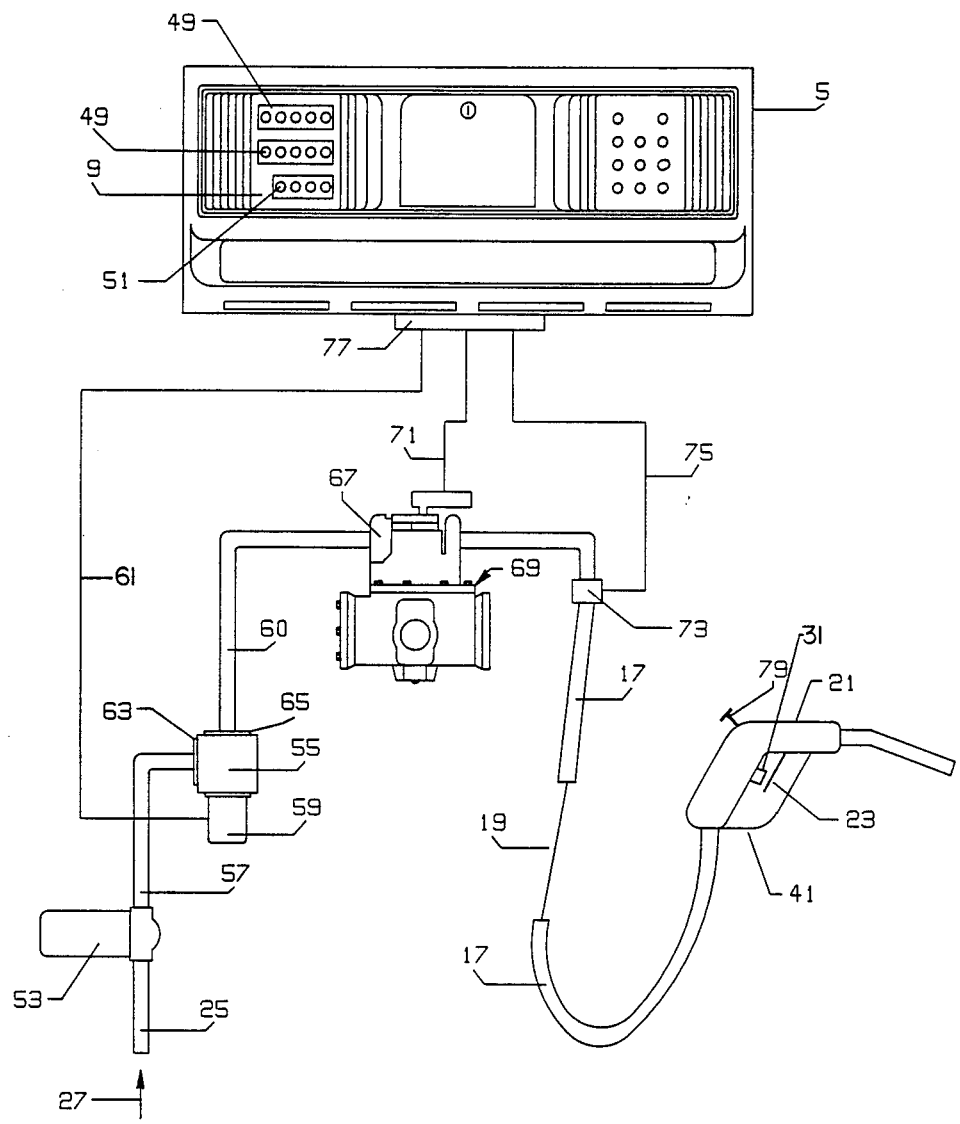
FIG. 3 is a detailed pictorial diagram showing various features of the present liquid dispensing system including illustrative embodiments of the invention.

A more detailed pictorial view of the main components of a dispensing system incorporating various embodiments of the present invention is shown in FIG. 3. Also, the display panel 9 includes a plurality of displays 49 for, in this example, providing a numeric display of the volume and price of fuel or liquid dispensed at any given time in a dispensing cycle. Also, in this example, the lowermost display panel 51 displays the price per unit quantity for the liquid or fuel selected for dispensing.

The fuel or liquid supply line 25 is connected through a conventional liquid filter 53 to a flow control valve 55 via fluid conduit 57. The electrical control 59 of valve 55 is electrically connected via a cable 61 to the controller 43 (located in housing 5). The valve 55 has an inlet 63 coupled to fluid conduit 57, and an outlet 65 coupled to a fluid conduit 60. The other end of fluid conduit 57 is coupled to an inlet 67 of a flow meter/pulser 69 for providing output pulses indicative of the rate of flow and volume of liquid being dispensed at a given time, via electrical cable 71 to the controller 43. The meter/pulser unit 69 is, in this example, a Gilbarco Model No. PA024TA10, manufactured by Gilbarco Inc., of Greensboro, N.C. The signal cable 19 (routed through or beside or formed within hose 17) is connected through an intrinsically safe electrical connector 73 to another signal cable 75, for electrically connecting the signals from transducer 31 and other electrical devices (to be described below) mounted on nozzle 21 to the controller 43. The individual electrical sub-cable 61, 71, and 75, in this example, are included within the cable assembly 77 running through one of the vertical posts 13 (see FIG. 1). The pushbutton 79 for operating a push-momentary switch 81 (see FIG. 4) mounted on nozzle 21, is pushed by an operator to latch or lock in a rate of flow of liquid being dispensed at the time of operating the switch 81.

Figure 4:
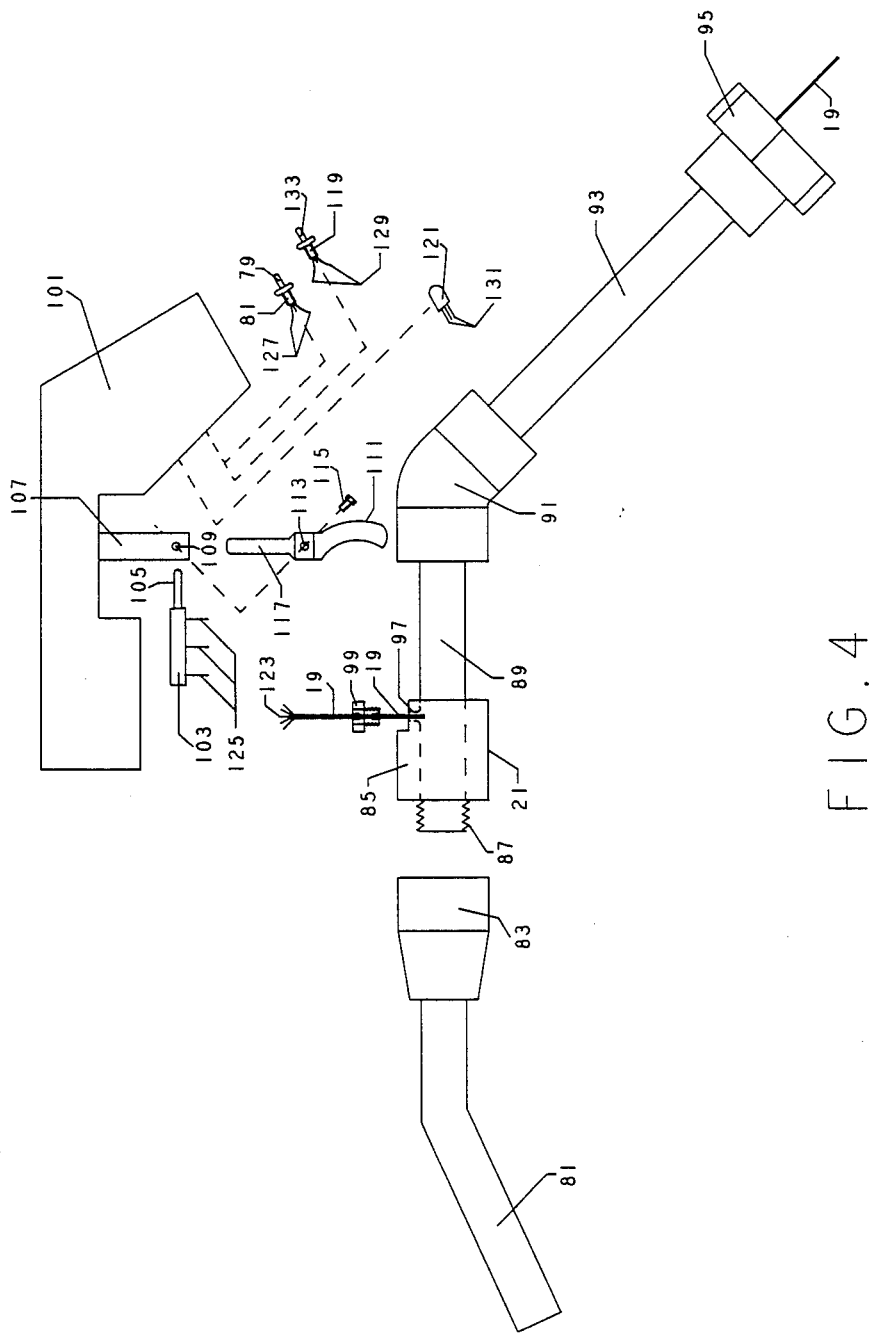
FIG. 4 is a pictorial showing an exploded diagram of an electronic nozzle assembly of one embodiment of the invention, for example.

A detailed pictorial exploded assembly view of an electronic nozzle assembly of one embodiment of the invention is shown in FIG. 4, that was included in an engineering prototype built to test various embodiments of the present invention. This illustration is not meant to be limiting. The nozzle spout 81 is connected through a fluid conduit coupling 83 to a conventional anti-drain valve 85 having a threaded male portion 87 for mating to coupling 83. The inlet of the anti-drain valve 85 is connected by a short piece of copper piping 89 to one end of an elbow 91, the other end of the elbow being connected by another piece of copper piping 93, to a nozzle inlet coupling 95, in this example. The piping 89 and 93, in spout 81, can be made from any suitable material. Accordingly, in this embodiment of the invention, the main portion of the nozzle 21 is essentially a straight through piece of piping. A threaded access hole 97 is included in the anti-drain valve housing 85 for receiving an intrinsically safe bulkhead connector 99 through which the signal cable 19 is inserted into the piping 89 and 93, as shown.

A housing 101, fabricated from a suitable material such as a plastic, is rigidly mounted by appropriate means over the portion of the nozzle 21 including the anti-drain valve 85, piping 89, elbow 91, and a portion of the piping 93. A trigger or flow actuator assembly is mounted rigidly to the housing 101, and includes a transducer 103 having a plunger 105, a mounting stud 107 having a hole 109, upon which is mounted an actuator or lever 111 having hole 113 through which a pin 115 is inserted into and through the hole 10 for securing the lever 111 to the mounting stud 107.

The transducer 103 is oriented to have the plunger 105 in its fully extended condition, and in this example, have its end rest against the upper portion 117 of actuator A latching switch 81, a reset switch 119, and an indicator lamp 121 are mounted on the housing 101 as shown. Individual conductors 123 of the electrical cable 19 are individually electrically connected to terminals 125 of transducer 103, terminals 127 of switch 81, terminals 129 of switch 119, and leads 131 of the indicator 121. In a laboratory prototype of the present invention, the nozzle assembly 21 included a linear position sensor, provided by a typical potentiometer type transducer, in this example. Other types of transducers can also be used for providing the position sensing function of transducer 103. Also, the switches 81 and 119 were push-momentary conventional switches.

During a given dispensing cycle, the nozzle assembly of FIG. 4 is operated by an operator pulling back on the actuator 111, causing plunger 105 to be pushed into the body of transducer 103, causing flow rate signals to be supplied to controller 43, as previously described. If the operator wishes to maintain a particular flow rate that is attained at a given time, the operator merely pushes the pushbutton 79 of latching switch 81 to lock in that particular flow rate. However, if after such latching the operator wishes to unlock the selected flow rate, the operator then must push pushbutton 133 of reset switch 119. The signalling from switches 81 and 119 is electrically connected via cable 19 to controller 43 for obtaining the desired functions. Also, the indicator lamp 121 is energized via controller 43 for indicating to an operator that the dispensing system itself is energized at a given time.

Figure 5:
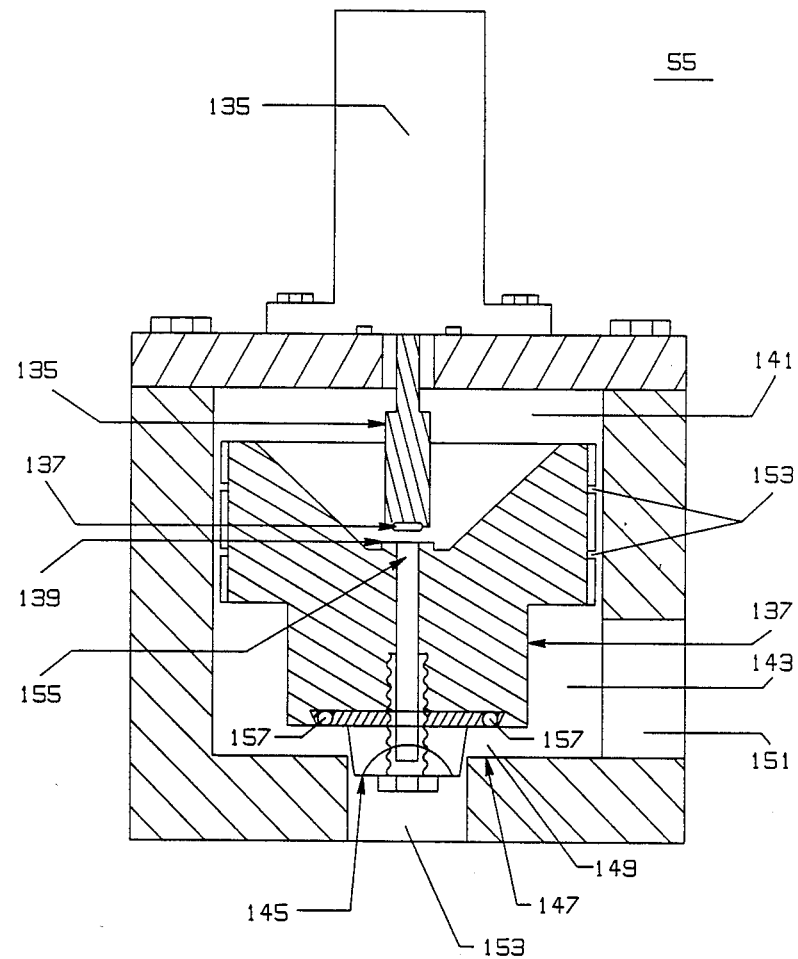
FIG. 5 shows a partial sectional view of an illustrative proportional solenoid flow control valve for use in one embodiment of the invention.

The flow control valve 45 can be provided by many known valves. One example of such a proportional solenoid valve, as shown in FIG. 5, was used in an engineering prototype incorporating various embodiments of the invention. The illustrative electrically operated proportional solenoid flow control valve 55 includes a proportional solenoid 135 operated via controller 43 for positioning a plunger 135, for in turn positioning a piston 137 for obtaining a desired flow rate for the liquid or fuel being dispensed. The plunger 135 includes a sealing tip 136, which when pushed against an orifice seat 139 of piston 137, causes the fluid pressure in the control cavity 141 to be greater than the pressure in the central cavity 143, in turn causing the piston 137 to move downward for decreasing the flow rate of liquid or fuel passing therethrough. Conversely, when the plunger 135 moves upward away from the orifice seat 139, the fluid pressure in the central chamber 143 becomes greater than that of the fluid pressure in the control cavity 141, causing piston 137 to move upward lifting throttle 145 away from valve seat 147, increasing the size of the annular gap 149, which in turn increases the rate of flow of liquid or fuel between the inlet port 151 and discharge port 153. Side grooves 153 are provided for creating a fluid turbulence to provide a fluid seal between the control cavity 141 and central chamber 143. A control orifice 155 provides an open fluid path between the central chamber 143 and control cavity 141 whenever the plunger 135 is positioned with sealing tip 136 away from the orifice seat 139. An O-ring seal 157 is provided about the throttle 145, as shown, for insuring that the valve is completely closed, preventing any flow of fluid, when piston 137 is moved down to the extreme downwardmost position for closing the valve.

Figure 6:
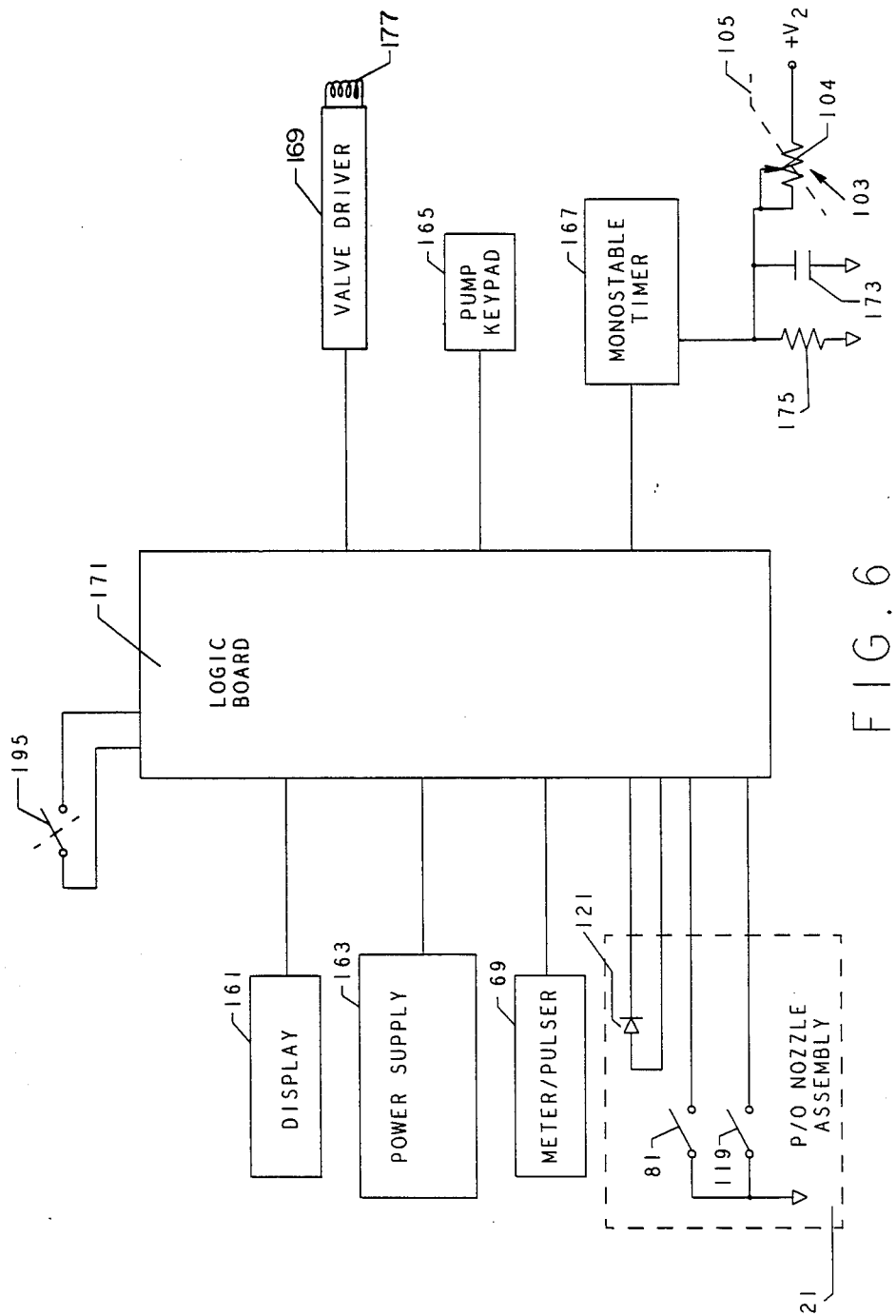
FIG. 6 shows a block schematic diagram of a microprocessor based controller of another illustrative embodiment of the invention.

In FIG. 6, a block/schematic diagram of the electronic control system, subassemblies, and system components used in the previously mentioned engineering prototype are shown, for purposes of illustration. The controller 43 includes, a display subassembly 161, a general purpose power supply 163, a pump keypad 165, a monostable timer 167, a valve driver circuit 169, and a Gilbarco Model No. T15897 modified T12C logic board 171 (manufactured by Gilbarco Inc., Greensboro, N.C., the present assignee). The logic board 171 includes a Z80 microprocessor, two Z80 Counter Timer Circuits (CTC) each with four counter timer channels and two Z80 Dual Asynchronous Receiver Transmitters (DART), for example. The Z80 microprocessor and associated family of peripheral controllers are linked by a vectored interrupt system. The latter uses a daisy-chain to implement a standard priority interrupt scheme.

As shown, the switch 81, reset switch 119, and indicator lamp 121 of the nozzle assembly 21 are electrically connected to the logic board 171. The transducer 103, in this example a variable potentiometer having a wiper arm movable by movement of plunger 105 attached thereto is connected between a source of voltage $+V_2$, and the common connection of a high-pass or filter capacitor 173 and resistor 175 with the monostable timer 167. The other ends of resistor 175 and capacitor 173 are connected to a source of reference potential. The transducer or potentiometer 103, in this example, forms a series voltage divider network with resistor 175, for inputting a voltage signal to the monostable timer 167 having a magnitude or voltage level corresponding to the position of the wiper arm/plunger 105 at any given time. The monostable timer 167 converts the signal voltage obtained from transducer 103 to a corresponding pulse width modulated signal which is connected from an output terminal of the monostable timer 167 to an input terminal of logic board 171. The logic board 171 applies an appropriate pulse width modulated valve drive signal, in this example, to a valve driver circuit 169 for energizing the solenoid winding 177 of the proportional solenoid flow control valve 55 of FIG. 3, for example.

Also note that pump handle switches such as switch 195, for example, are connected to the logic board 171. Such pump handles switches 195, as previously explained, are located within the storage boots 29 of the dispenser 1 (see FIG. 1). When a nozzle 21 is returned to the righthand boot 29 of FIG. 1, the associated pump handle switch 195 will be opened, causing logic board 171 to respond by preventing any energization of the associated valve solenoid winding 177.

Note that the meter/pulser 69 is electrically connected to the logic board 171. The meter/pulser 69 supplies pulses to the logic board indicative of the flow rate and volume of liquid being dispensed at any given time in a dispensing cycle.

Note that the Gilbarco T12C logic board was modified in this example, to provide that an input from the monostable timer 171, switch 81, and reset switch 191 are routed to the second DART (DART2) inputs which are capable of generating Z80 system external event vectored interrupts.

The operation of the preferred embodiment of the present invention will now be described. A primary difference between the present dispensing system incorporating various embodiments of the invention and conventional fuel or liquid dispensing systems is that in the present system, as previously described, fluid flow is controlled remote from rather than at the nozzle. The operator or user of the present system is provided an actuator lever or trigger 111 similar to conventional systems.

When an operator removes a nozzle 21 from a boot 29, the associated pump handle switch 195 will close, signalling the logic board 171 to energize appropriate dispenser system components. Liquid dispensing is initiated by the operator squeezing or moving actuator 111, causing transducer 103 to produce an output voltage that is converted by monostable timer 171 into a pulse width modulated signal, as previously described, which is processed by logic board 171 for providing a appropriate drive signal to the valve driver circuit 169, which in turn energizes solenoid coil 171 for opening the flow control valve 55 to the extent necessary to obtain the called for flow rate. This flow rate can be maintained or locked in by the operator pushing the button 79 of switch 81, for signalling logic board 171 to latch in the flow rate. This latch condition can be terminated either by the operator pushing button 133 of reset switch 119, or pushing button 79 of switch 81, for signalling the logic board 171 to unlatch the flow rate, returning control to the operator via movement of the actuator lever 111. In the preferred embodiment of the invention, the flow control valve 55 is a proportional solenoid control valve 55, permitting the flow rate to be substantially infinitely selectable over a given range of various flow rates.

Figure 7:
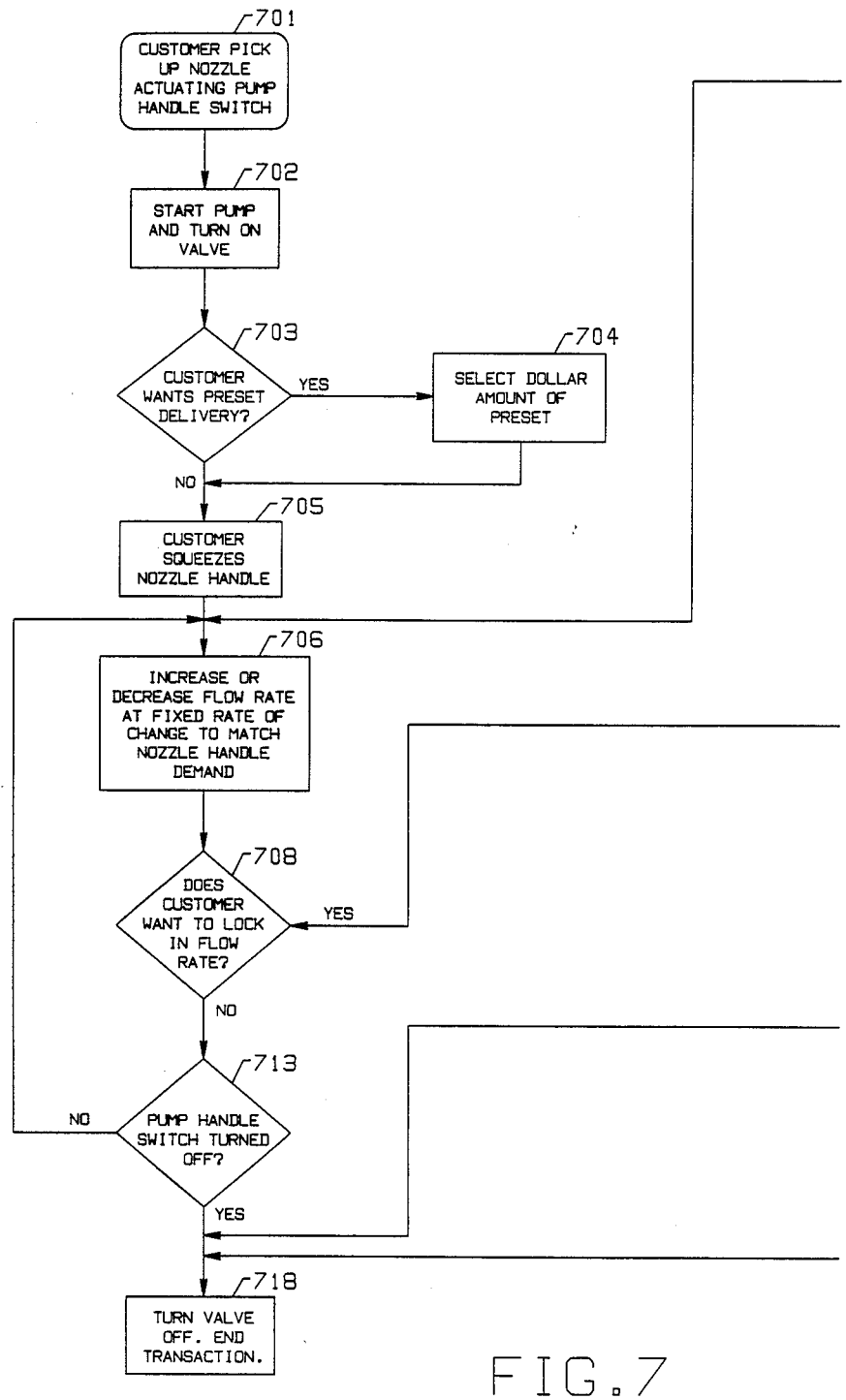
FIG. 7 shows a flow chart detailing the overall system operation of one embodiment of the invention.
Figure 7:
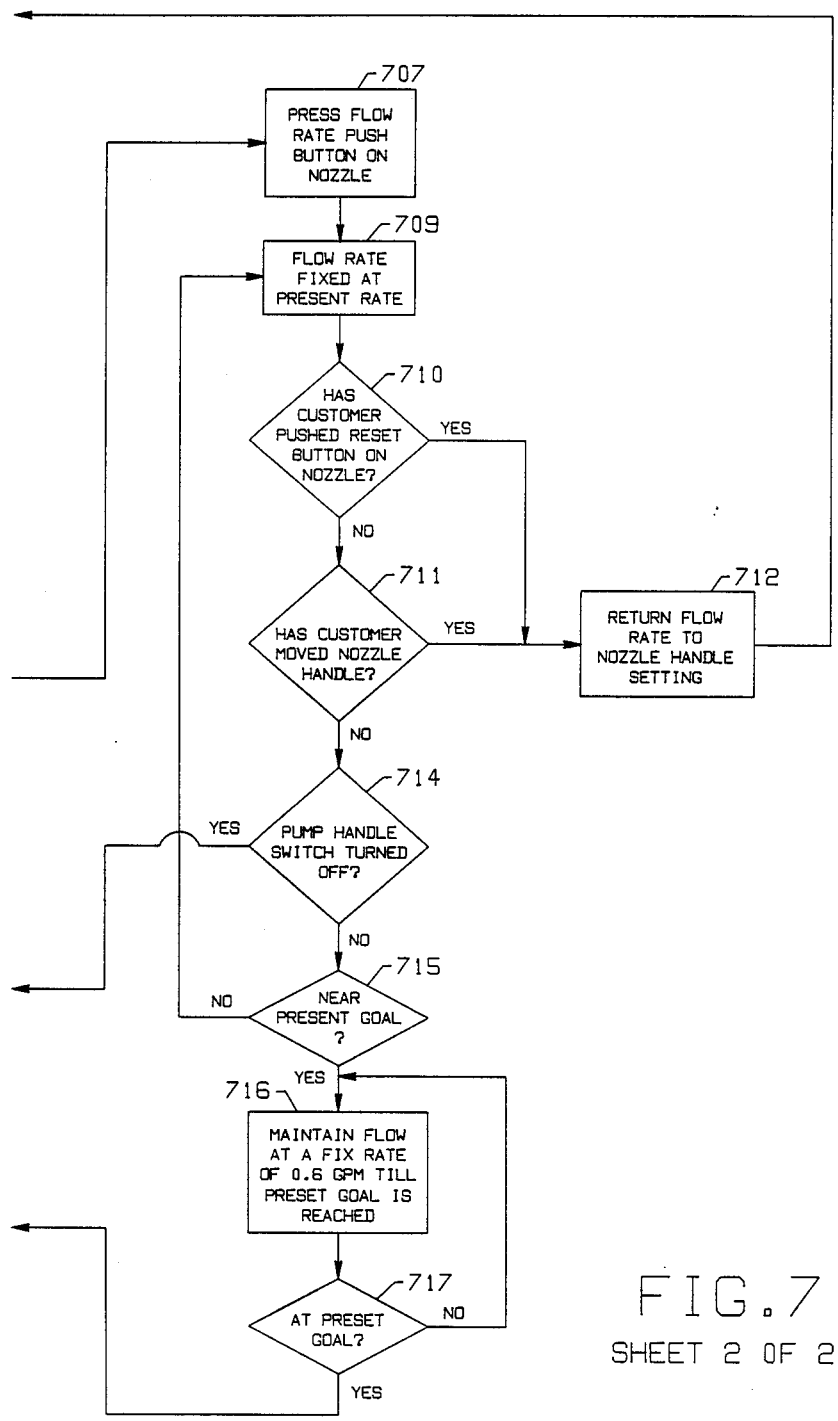
Figure 8:
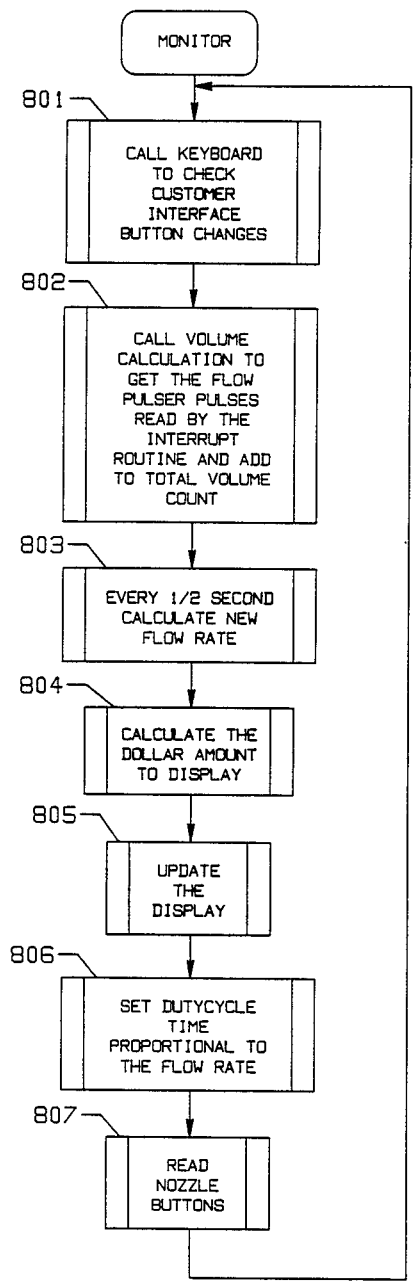
FIG. 8 shows a flow chart for a monitoring function of an embodiment of the invention.
Figure 9:
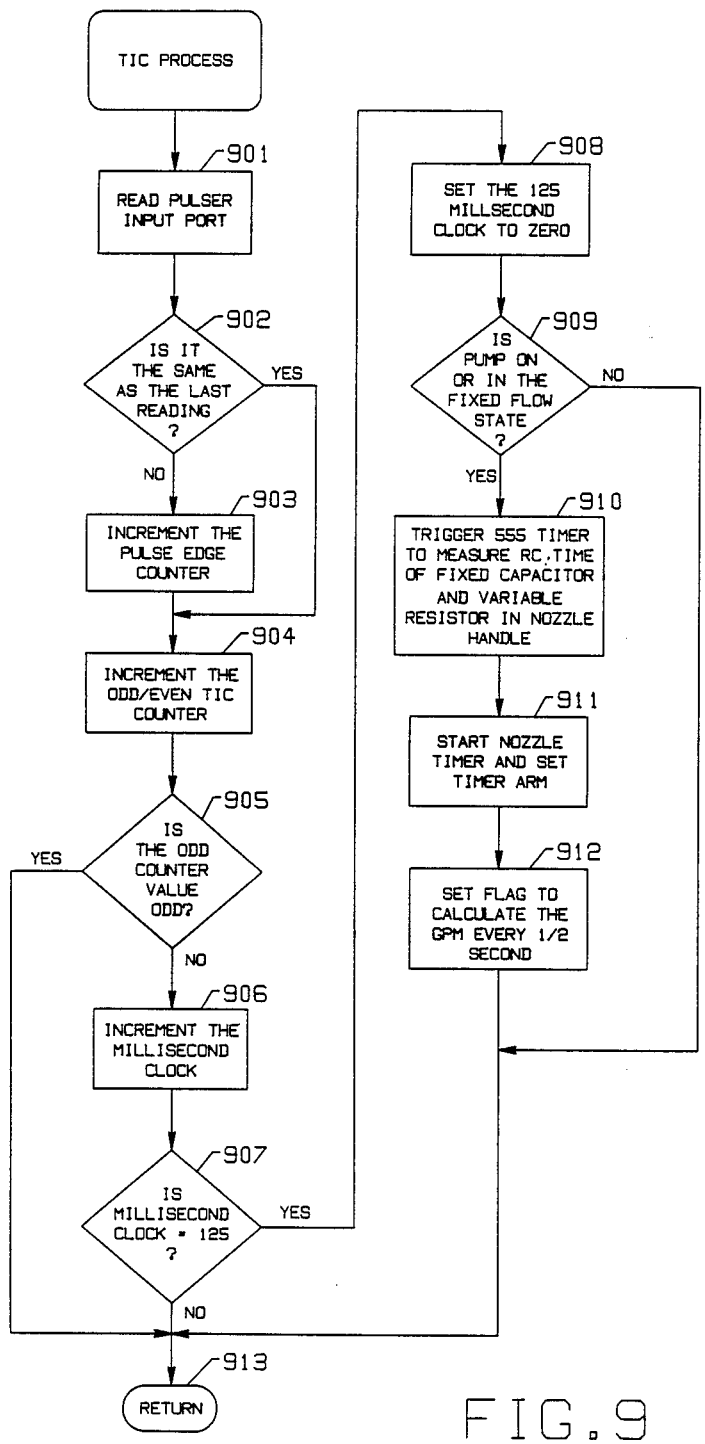
FIG. 9 shows a flow chart for an Interrupt Service Routine (ISR), illustrated as a Timed Interrupt Control Process (TIC) of an embodiment of the invention.

The flow chart in FIG. 7 shows the generalized operation of an embodiment of the present system used on the previously mentioned engineering prototype. Reference is made to steps 701 through 718. Further programming of the preferred embodiment of the invention for programming the Z80 microprocessor of logic board 171 is shown in the flow charts of FIGS. 8 through 12. In FIG. 8, the main program (MONITOR), and a number of interrupt and other subroutines are also programmed into the system, as shown in the flow charts. The MONITOR does not contain interrupt service routine (ISR) call. The ISR are shown in FIG. 9.

With reference to FIG. 8, the main program MONITOR includes a continuous loop of subroutines calls used to service the pump keypad 165, update the display 161, and the proportional flow control valve 55 duty cycle. Various subroutines for the keyboard 165 and display servicing are not shown in the various flow charts, in that this programming is standard programming provided off-the-shelf by Gilbarco Inc., Greensboro, N.C., for use on Gilbarco T12C logic boards, such as logic board 171.

With further reference to FIG. 8, steps 801 through 807 comprise the MONITOR routine. The MONITOR is a continuous loop of subroutine for servicing the pump keypad 165, calculation routines for the display 161, and setting the proportional flow control valve 55 duty cycle. Fuel flow volume from the meter/pulser 69 are monitored and used for feedback in controlling the opening of the proportional solenoid valve 55, in this example.

In the Monitor routine, the monostable timer 167 is triggered every 125 milliseconds, and uses the flow rate signal voltage from transducer 103 for providing appropriate pulse width modulated signals to the logic board 171, as previously explained. The logic board 171 is programmed via the CTC2 interrupt routine steps 1101 through 1111, for programming the Z80 CTC to convert the output signal from timer 167 to a pulse width modulated waveform. The pulse width modulated waveform is proportional to the width of the output pulse provided by monostable timer 167.

Fuel flow volume and flow rates from the meter/pulser 69 are monitored and used for feedback in controlling the opening of the proportional solenoid valve 55, in this example. The results of the various interrupt routines are used in the subroutine "Duty Cycle" shown in the flow chart of FIG. 12, for setting the pulse width modulated control signal applied to the valve driver circuit 169, and also for providing a damping routine to control changes in the valve drive signals in a manner to avoid oscillation of the valve 55, as previously described.

With reference to the flow chart of FIG. 9, a CTC channel is programmed to cause a vectored interrupt every 500 microseconds. Normal program flow is then vectored to an interrupt service routine (ISR) "timed interrupt control process" (TIC). Various hardware and software clocks are included on the logic board 171, and mention of such clocks is made in the various steps of the TIC process, and other flow chart routines. The TIC process includes steps 901 through 913. Note that in step 910, the value of the variable resistor 104 of transducer 103 is changed due to changes in the corresponding position of plunger 105, corresponding to changes in the position of actuator 111, which effects the level of the voltage across resistor 175 and capacitor 173, and correspondingly causes changes in the timing of the monostable timer 167, as previously explained. This flow rate signal voltage, as a result, affects the width of the timer 167 output. A positive edge of an active low output signal from the monostable timer 167 triggers, via logic board 171, a "Dart2" interrupt routine (see FIG. 10), for reading the output of a nozzle time counter (not shown). Note that the TIC process is called by an interrupt timer (not shown) every 500 microseconds.

Figure 10:
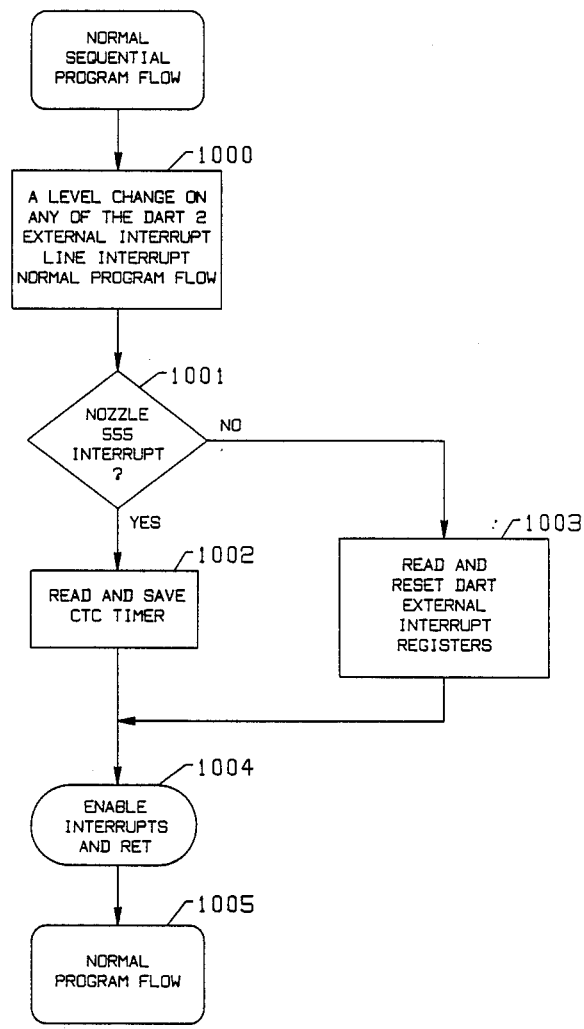
FIG. 10 shows a flow chart for the ISR used to service a Z80 Dual Asynchronous Receiver Transmitter (DART) external vectored interrupt caused by a state change of the illustrated monostable timer 167 of FIG. 6, of an embodiment of the invention.

With further reference to FIG. 10, in the Dart2 routine, the timed interrupt or TIC process triggers the monostable timer 167 to become instable every 125 milliseconds, and uses the flow rate demand signal from transducer 103 for providing appropriate pulse width modulated signals to the logic board 171. When timer 167 returns to its stable state, it causes the Dart2 routine to be initiated by an external interrupt. The length of time that the timer 167 remains in an instable state is controlled via an RC timing circuit formed by resistors 103 and 175, and capacitor 173 (see FIG. 6).

In step 1000, a level change on any of the DART2 external interrupt lines (not shown) causes a vectored interrupt to this service routine. As a result, normal programming flow is temporarily terminated until the Dart2 routine is completed. The Dart2 routine saves the counter timer circuit (CTC) time which is proportional to the reset time of monostable timer 167. The Dart2 routine includes steps 1000 through 1005.

Figure 11:
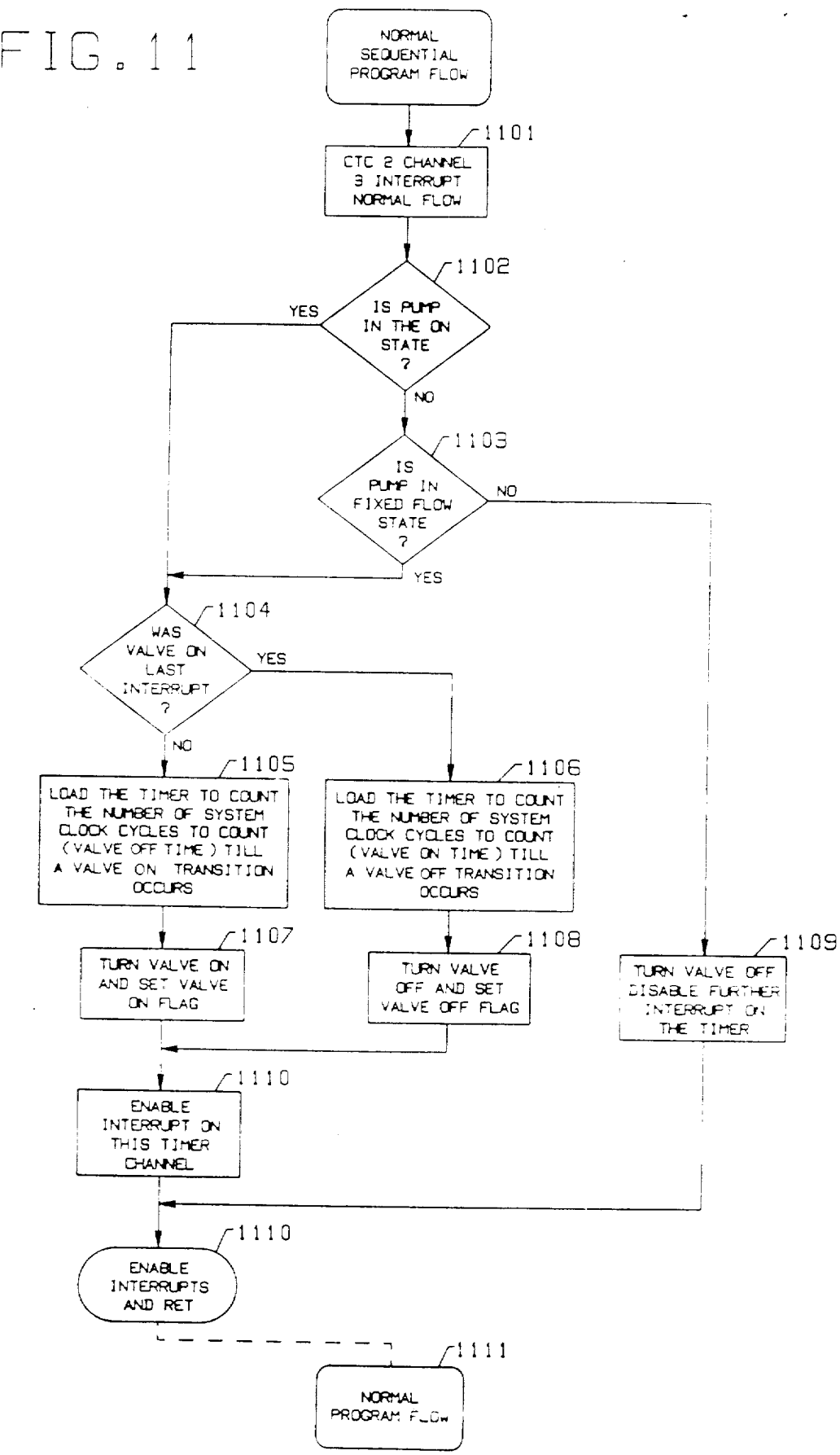
FIG. 11 shows a flow chart for a Z80 Counter Timer Circuit(CTC2, i.e. the second of two Z80 CTC circuits) channel 3's Interrupt Service Routine(ISR) of an illustrative embodiment of the invention.

With reference to FIG. 11, a CTC2 channel 3 is programmed in the count mode. The counter (not shown) input is fed a 25 kHz signal. The count is loaded in a CTC down counter register (not shown). For every input cycle, the CTC down count register on logic board 171 is decremented. In step 1101, a down count of zero by channel 3 of CTC 2 (not shown) causes a vectored interrupt to this service routine. Then this routine is completed, program control is returned to the routine which was interrupted. The interrupt service routine is then reloaded with an on or off count depending upon whether an on or off count was previously loaded. The "ON" and "OFF" times are maintained by the "Monitor" cycles' "duty cycle" routine shown in the flow chart of FIG. 12, in a manner providing that the sum of the of the ON and OFF counts are made equal to 100 counts, for forming a pulse width modulated waveform having a period of 25kHz. In this manner, the timed output signals from the monostable timer 167 are converted to a pulse width modulated waveform via a software routine.

Figure 12:
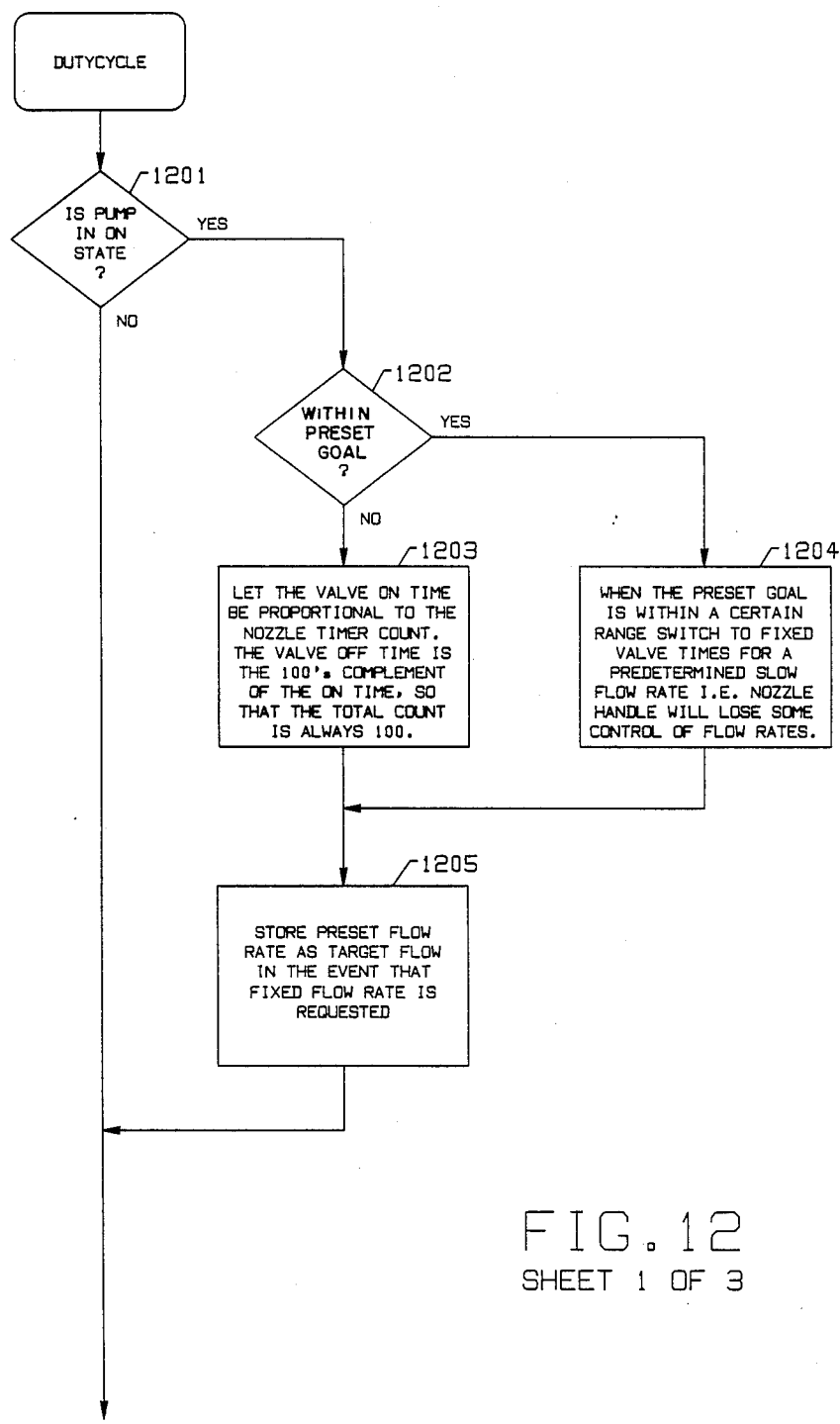
FIG. 12 shows a duty cycle subroutine for the monitor program loop shown in FIG. 8, in an illustrative embodiment of the invention.
Figure 12:
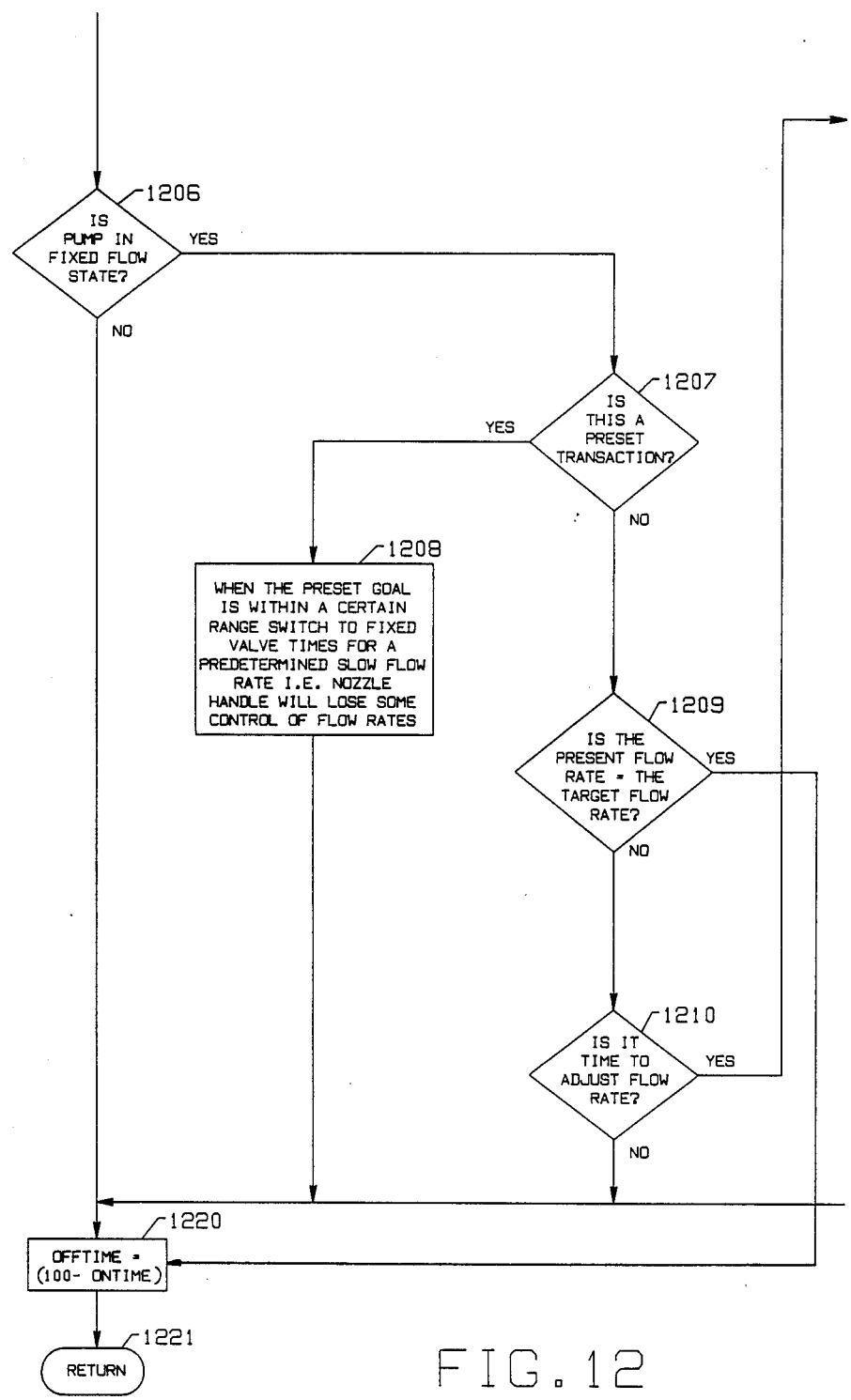
Figure 12:
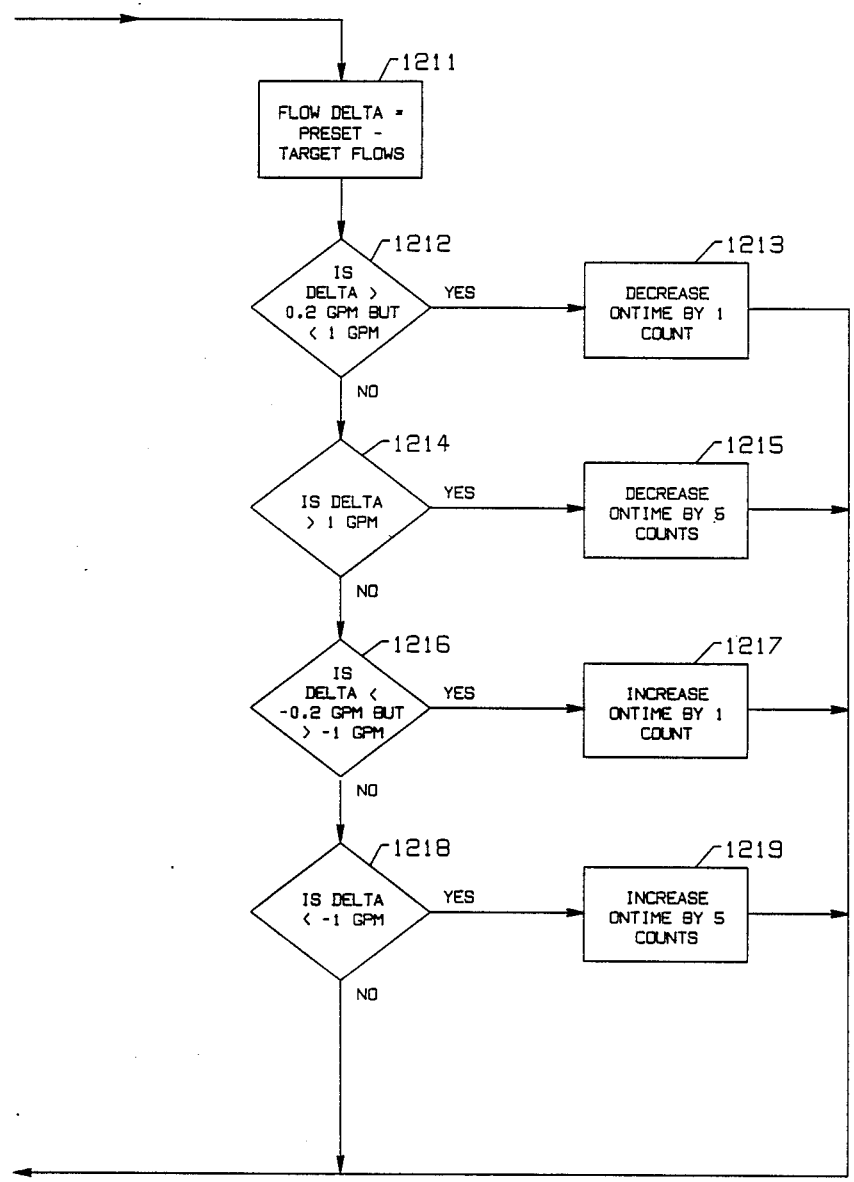

The "Dutycycle" routine, shown in the flow chart of FIG. 12, includes steps 1201 through 1221, as shown. Note that in step 1202, the pulse width modulated dutycycle is made proportional to the width of the output pulse from monostable timer 167. Also, in step 1203, in a "pump on" state, a 28kHz CTC down counter (not shown) on logic board 171 is loaded with a count to form a pulse width modulated valve control signal. Also note that steps 1212 through 1219 represent a damping algorithm to adjust the dutycycle timing to provide the nozzle flow demand indicated by the flow rate signal from transducer 103, while avoiding unstable flow oscillation or oscillation of the valve 55, as previously described.

Although particular illustrations have been used to describe various embodiments of the invention, they are not meant to be limiting, and other applications and uses of the present invention are also intended to be covered by the spirit and scope of the appended claims. For example, transducer 31 of FIG. 2 can be provided by an integrated transducer in the nozzle 21, or by some other suitable type of transducer. The entire system could be automated, to eliminate manual control, and so forth.

What we claim is:

1. A liquid dispensing system comprising:
   a relatively small and light weight nozzle for dispensing liquid;
   flow rate selection means mounted on said nozzle, including flow rate signalling means including a manually positionable transducer means for selectively producing a flow rate signal indicative of a desired flow rate for dispensing a liquid;
   a relatively thin walled flexible hose for conveying liquid;
   control means electrically connected to said flow rate selection means, said control means being responsive to said flow rate signal for producing a control signal;
   electrically operated flow control valve means, responsive to a control signal for delivering liquid into one end of said hose at said desired flow rate, the other end of said hose being coupled to an inlet of said nozzle;
   said flow rate selection means further including manually operated first switch means for selectively producing a latching signal; and
   said control means further including means responsive to said latching signal for maintaining the control signal at a level fixing the flow rate at that called for by the flow rate signal at the time of producing said latching signal.

2. The liquid dispensing system of claim 1, further including:
   second switch means in said flow rate selection means for selectively producing a reset signal; and
   flow rate level fixing means in said control means responsive to said reset signal for transferring control of the flow rate back to said means for producing said flow rate signal.

3. The liquid dispensing system of claim 1, wherein said control means further includes means responsive to operation of said flow rate signalling means after a predetermined time from the occurrence of said latching signal for transferring control of the flow rate back to said flow rate signalling means.

4. The liquid dispensing system of claim 1, wherein said valve means consists of a proportional flow control valve.

5. The liquid dispensing system of claim 4, wherein said control means further includes means for converting said flow rate signal to a pulse width modulated control signal for controlling said proportional flow control valve.

6. The liquid dispensing system of claim 5, wherein the magnitude of said flow rate signal is analogous to the selected flow rate at a given time, and said pulse width converter means includes a monostable timer responsive to the magnitude of said flow rate signal for producing an output pulse having a pulse width proportional to the magnitude of said flow rate signal, said output pulse being analogous to said control signal.

7. The liquid dispensing system of claim 5, wherein sad control means further includes microprocessor means connected between said pulse width converter means and said valve means, responsive to said control signal for driving said valve means in accordance with preprogrammed conditions.

8. The liquid dispensing system or claim 7, further including:
   metering means connected between said valve means and said nozzle for producing pulses corresponding to the volume of liquid dispensed during a dispensing cycle; and
   means for providing entry of a volume signal to said microprocessor means indicative of a desired volume of liquid to be dispensed;
   said microprocessor means being programmed to respond to said pulses from said metering means and to said volume signal, for closing said valve means in manner permitting only the desired volume to be dispensed from said nozzle.

9. The liquid dispensing system of claim 1, wherein said control means further includes damping means for controlling changes in said control signal for changing flow rates in a manner substantially preventing undesirable oscillation of said valve means.

10. The liquid dispensing system of claim 1, further including an indicator mounted upon said nozzle, said control means including indicator driving means for energizing said indicator to indicate that said liquid dispensing system is in an activated condition.

11. The liquid dispensing system of claim 1, further including pump handle switch means being receptive of said nozzle for storage thereof, said pump handle switch means producing a system on signal whenever said nozzle is removed therefrom, sad control means further including means responsive both to said system on signal for energizing said liquid dispensing system, and to the termination of said system on signal for de-energizing said liquid dispensing system whenever said nozzle is returned for storage upon said pump handle switch means.

12. In a liquid dispensing system including a nozzle for dispensing liquid, a transducer integral with said nozzle, a flow handle connected to said transducer, said handle being squeezable for causing said transducer to produce an electrical flow rate signal having a magnitude analogous both to the degree of movement of said handle from a null position and desired flow rate, for dispensing said liquid from an outlet of said nozzle, a hose connected at one end to an inlet of said nozzle and at its other and to the outlet of a flow meter, a proportional valve connected in series with said flow meter and a pump for supplying said liquid under pressure, means for selecting a given volume of liquid to be dispensed, a latching switch mounted upon said nozzle, a reset switch mounted upon said nozzle, a pump handle switch operable to a closed position when said nozzle is removed from a st-rage receptacle built into a housing of said system, a display for displaying the price and volume of liquid dispensed in a given dispensing cycle, and a microprocessor based controlled programmed for a method comprising the steps of:
  sensing the closure of said pump handle switch;
  energizing said pump and said valve;
  sensing the magnitude of said flow rate signal;
  opening said proportional valve to a setting for dispensing said liquid from said nozzle at a flow rate called for by said flow rate signal
  sensing said selecting means for a preset volume of said liquid for dispensing during a given dispensing cycle;
  sensing output signals from said flow meter indicative of the volume of liquid being dispenser; and
  closing said valve in a manner for dispensing only the preset volume of liquid.

13. The method of claim 12 further including the step f sensing the momentary closure of said latching switch for locking in the setting of aid valve for maintaining the flow rate established at the time of operating said latching switch.

14. The method of claim 13 further including the steps of:
  sensing a subsequent monetary closure of said latching switch for unlatching the setting or said valve; and
  sensing the magnitude of said flow rate signal for establishing the degree of opening of said valve for obtaining a desired rate of flow of said liquid.

15. The method of claim 12, wherein the step of closing said valve includes the steps of:
  changing the rate of flow to a relatively low fixed rate until the preset volume is reached; and
  closing said valve when said preset volume is reached.

16. In a liquid dispensing system including a pump for delivering liquid under pressure, a flow meter for providing output metering signals indicative of the volume and/or rate of flow of said liquid during a dispensing cycle, and an electronic controller, wherein the improvement comprises:
  a relatively small and liqhtweight nozzle assembly including an inlet for receiving liquid, an outlet for dispensing fluid, and a flow control means manually positionable for establishing a desired rate of flow of said liquid;
  transducer means integral with said nozzle assembly and connected to said flow control means, for producing an electrical flow rate signal having a magnitude both proportional to the position of said flow control means from a datum position at any given time, and corresponding to the desired rate of flow;
  a relatively thin walled flexible hose having a relatively small outside diameter, for coupling an outlet of said meter to the inlet of said nozzle;
  a proportional flow control valve means located remote from said nozzle assembly, having an inlet connected to said pump, and an outlet connected to an inlet of said flow meter, and responsive to a control signal for opening to provide a desired rate of flow; and
  a latching switch mounted of said nozzle assembly, said latching switch being operable for signalling said controller to latch in a presently established flow rate for dispensing said liquid;,
  said controller being electrically connected to said transducer means and said valve means, and responsive to said flow rate signal from said transducer means for producing and varying a characteristic of said control signal in correspondence to changes in the magnitude of said flow rate signal, for correspondingly changing the opening of said valve means to provide desired rates of flow of said liquid over a dispensing cycle.

17. The liquid dispensing system or claim 16 further including a reset switch mounted on said nozzle assembly, said reset switch being operable for signalling said controller to unlatch the established flow rate, and return control of the setting of the flow rate to said flow control means.

* * * * *

UNITED STATES PATENT AND TRADEMARK OFFICE
CERTIFICATE OF CORRECTION

PATENT NO. : 4,934,565

DATED : June 19, 1990

INVENTOR(S) : George H. Heisey and George T. Devine

It is certified that error appears in the above-identified patent and that said Letters Patent is hereby corrected as shown below:

In the drawing, Sheet 12, Fig. 11, in block 1105, line 4, change "ON" to --OFF--, and in line 5, change "OFF" to --ON--; and in block 1106, line 5, change "ON" to --OFF--. (per attached sheet)

Signed and Sealed this

Seventeenth Day of September, 1991

Attest:

HARRY F. MANBECK, JR.

*Attesting Officer*      *Commissioner of Patents and Trademarks*